March 24, 1953  H. P. CORDES  2,632,411
ROTARY PLANT SETTING DEVICE
Filed Oct. 24, 1946  3 Sheets-Sheet 1

INVENTOR
Henry P. Cordes
BY
ATTORNEYS

March 24, 1953 H. P. CORDES 2,632,411
ROTARY PLANT SETTING DEVICE
Filed Oct. 24, 1946 3 Sheets-Sheet 2

INVENTOR
Henry P. Cordes
BY
ATTORNEYS

March 24, 1953  H. P. CORDES  2,632,411
ROTARY PLANT SETTING DEVICE
Filed Oct. 24, 1946  3 Sheets-Sheet 3
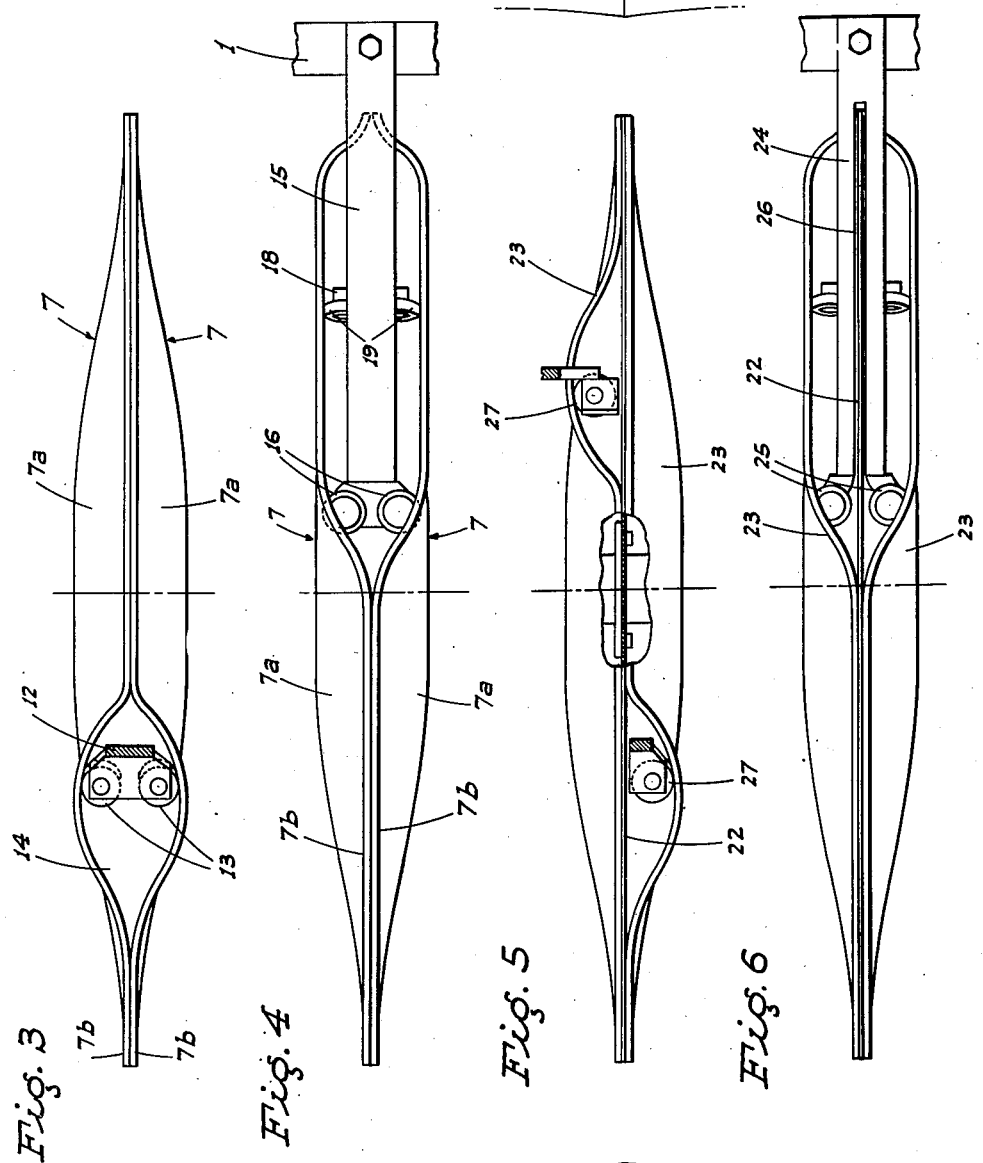
INVENTOR.
Henry P. Cordes
BY
ATTYS Patented Mar. 24, 1953

2,632,411

UNITED STATES PATENT OFFICE 2,632,411

ROTARY PLANT SETTING DEVICE

Henry P. Cordes, Modesto, Calif.

Application October 24, 1946, Serial No. 705,428

3 Claims. (Cl. 111—3)

This invention relates generally to a row crop plant setter of the type which functions to mechanically set young nursery grown plants in field rows in substantially predetermined spaced relation.

It is an object of the invention to provide a simple plant setting device having a pair of annular walls which rotate normally in face to face engagement around a common axis, there being means for separating these annular walls at a point above the ground so that the stem of a plant may be placed therebetween, and further means for separating the annular walls at a point adjacent the ground so that the plant will be released while the roots thereof project into a furrow. At least one of these annular walls is of flexible character, so that by flexure thereof, the walls may be separated in a manner and for the purpose described.

It is a further object of the invention to support at least one of the annular walls referred to in the foregoing paragraph by resilient means which may comprise a circular wall of flexible material connected to or integrally formed with the annular wall.

It is a further object to provide a plant setter of the character described having a pair of circular members, at least one of which is made of flexible material, these circular members being supported so that they rotate normally in concave or dish-shaped form with the peripheral portions thereof in engagement, the device having means for separating the peripheral portions of the circular members at a selected point above the ground for insertion of plants between the peripheral portions thereof, and for the subsequent release of the plants from between the peripheral portions so that they will be deposited in a furrow.

A distinguishing feature of the invention is that it includes the spreading of the engaged faces of the circular members for a definite arc of rotation of such discs whereby a freely open space is available to the operator over such entire arc of rotation, which allows the operator an adequate opening in which to properly position the plant between the circular members before it is gripped by the cooperating faces thereof.

A further object of the invention is to provide a practical plant setting device, and one which will be exceedingly effective for the purpose for which it is designed.

These objects are accomplished by means of such structure and relative arrangement of parts as will fully appear by a perusal of the following specification and claims.

In the drawings:

Fig. 3 is a top plan view of the gripping discs showing the spread apart area at the upper side thereof for receiving the plants.

Fig. 4 is a bottom plan view of the discs showing the spread apart area for discharging the plants.

Fig. 5 is a similar view to that of Fig. 3, but showing a modified form of disc structure.

Fig. 6 is a similar view to that of Fig. 4, but showing the modified form of disc structure disclosed in Fig. 5.

Figure 1:
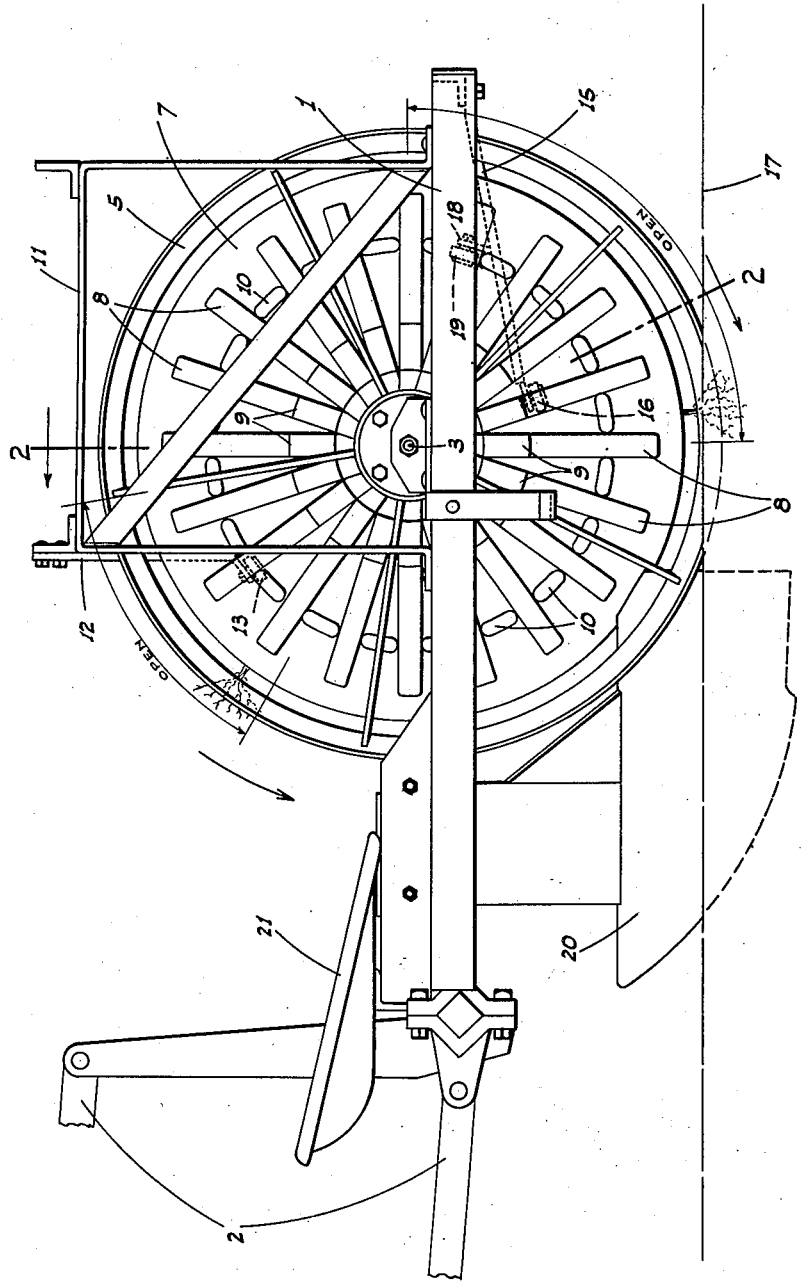
Fig. 1 is a side elevation of the plant setter.
Figure 2:
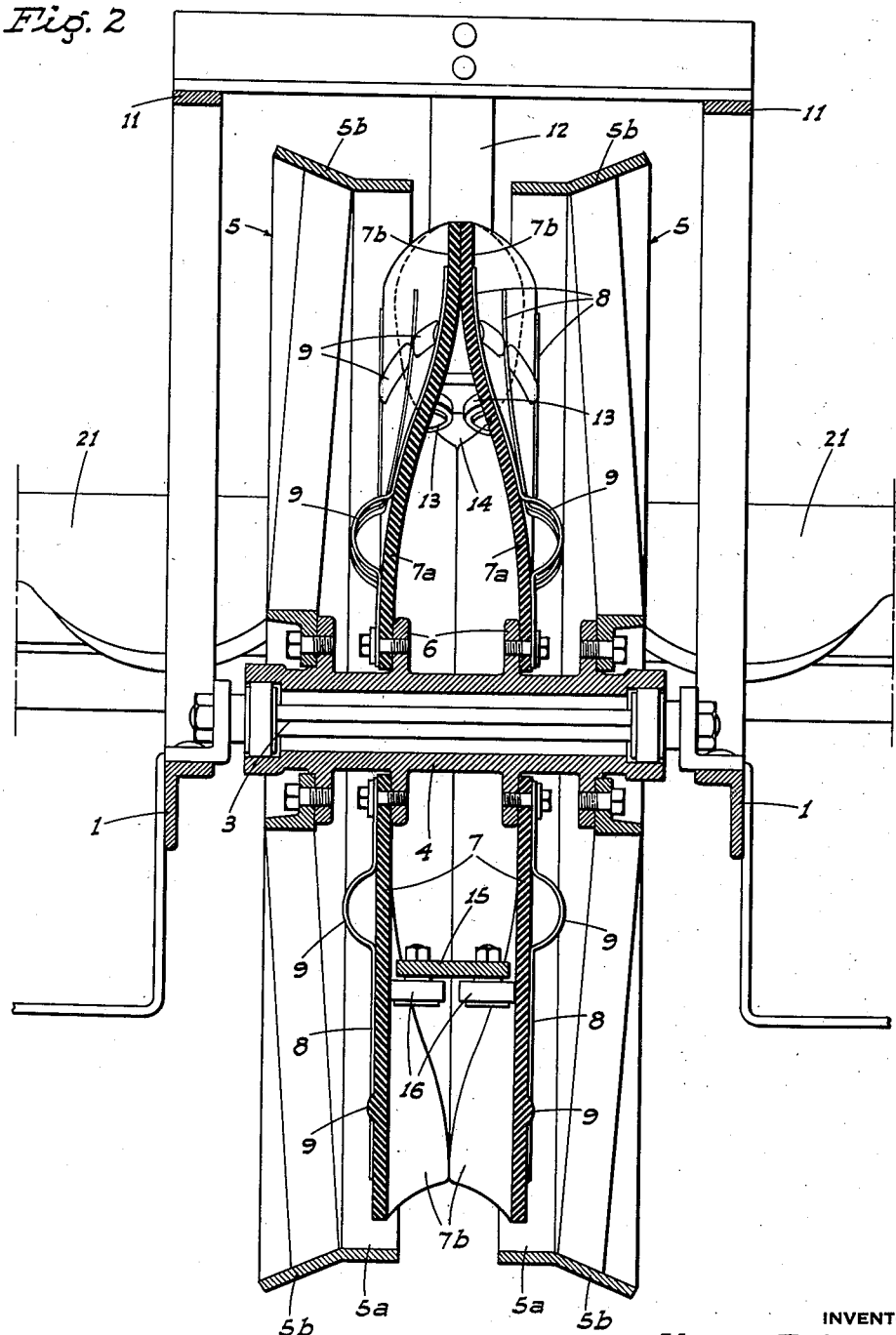
Fig. 2 is a sectional view taken on a line 2—2 of Fig. 1.

Referring now more particularly to the characters of reference on the drawings, the numeral 1 designates the frame of the machine having a draft means 2 for connection with any source of draft power such as a tractor or the like; the present construction being that by which the plant setter could be connected to the draft and lift links of a tractor of the lift type.

An axle 3 is mounted in the frame 1, and on this axle is journaled a hub 4 on which are secured a pair of spaced supporting and driving wheels 5 adapted to engage the ground, and to rotate through frictional engagement with the ground as the planter is pulled along by the tractor. On the hub 4 and between the wheels 5 are a pair of spaced flanges 6, to each of which is bolted a disc 7. These discs 7 are made of relatively stiff but flexible material, such as rubber or the like.

Also bolted to the flanges 6 and projecting radially out therefrom in spaced relation, are a plurality of resilient fingers 8, each finger 8 being provided with a bowed portion 9 in order to readily allow the fingers to be flexed outwardly. Said fingers engage the outer surfaces of the discs 7 and are of a configuration and tension such that they will press the peripheral portions of the discs 7 together, thereby deforming the discs and producing thereof, dished or concave circular members 7a, the annular peripheral wall portions 7b of which are normally in engagement or at least so closely spaced that they will grip the stem or stalk of a plant placed therebetween. Lugs 10 are formed on the outer faces of the discs in relatively spaced relation to the side edges of the fingers 8 in order to hold such fingers in properly spaced relation at all times.

On the frame 1 is an upstanding rectangular frame 11, to the front face of which is secured a downwardly projecting bar 12, which bar extends between the inner faces of the circular members 7a, and on the lower end of which is mounted a pair of rollers 13 so spaced apart as to engage the inner faces of the members 7a and to spread the engaged peripheral portions 7b thereof apart through a certain arc of rotation thereof, as indicated by the arrows and the word "Open" at the upper side of Fig. 1.

It will thus be seen that during this arc of rotation of the circular members 7a their peripheral portions 7b are spread substantially apart in order to form an open space 14, into which a plant may be readily inserted, the action of the spring fingers 8 functioning to again return the members 7a to dished form, press the peripheral wall portions 7b thereof together as the members 7a leave this arc of rotation, and thus grip the stem of the plant between the same and carry it around with the rotation of the members 7a, which rotation is being imparted to the members 7a through the hub 4 driven by the wheels 5.

Fixed to the rear end of the frame 1, and projecting between the inner surfaces of the circular members 7a, is another bar 15, on the inner end of which is a pair of spaced rollers 16, which engage the inner surfaces of the members 7a at a point substantially above the point at which the peripheral portions 7b of the members 7a pass the ground level 17 with the forward travel of the plant setter. These rollers 16 therefore spread the members 7a apart just as the peripheral portions thereof reach the ground level and, therefore, release the engaged plant from the frictional grip of the peripheral portions 7b.

On the bar 15, at a point intermediate its ends and projecting to a point slightly above the plane of its point of connection with the frame 1 is a bracket 18, carrying a pair of rollers 19 which likewise engage the inner surfaces of the members 7a at that point, and thus, in combination with the rollers 16, hold the members 7a spread apart for an arc of rotation from the ground level to a point which will clear the bar 15 so as to avoid undue frictional contact of the inner surfaces of the annular peripheral wall portions 7b with the edges of said bar.

Mounted on the frame 1 forwardly of the wheels 5 is a furrow-making shoe 20, which prepares the furrow for the reception of the plants as they are released from the discs. The rims of the wheels 5 each have a cylindric portion 5a and adjacent thereto, a conoidal portion 5b for forcing the earth along the furrow inwardly so as to close the furrow around the roots of the plants as they are released from the annular wall portions 7b.

A seat 21 is mounted on the frame 1 for the operator and there may be one of these on each side of the machine, and there will of course be provided means (not shown) for holding the plants to be fed into the opening 14.

It will be seen from the foregoing description that with the rotation of the circular members 7a, there is at all times a constant opening 14 of materially large dimensions into which the operator may project the plants, and this opening being constant allows him enough space and sufficient time in order to properly position the plant for gripping by the engaged peripheral faces of the discs as they come together again. A skilled operator soon learns to time the placement of the plants through said opening as to cause them to be substantially equally spaced apart as they are released from the contacting peripheral faces of the discs and deposited in the ground.

In Figs. 5 and 6, I show a slightly modified form of the invention. Here instead of the peripheral faces of the circular members themselves being in face to face contact, I provide an intermediate solid disc 22 of the same diameter as the flexible dish-shaped members here indicated by the numeral 23, and against the outer peripheral faces of which disc 22 the inner peripheral faces of the members 23 are maintained normally in contact. To accommodate this central disc 22 the bar 24, which holds the rollers 25, is slotted, as at 26. Otherwise the structure and function of the device is substantially the same as described for the primary species of the invention.

The rollers 27, which control the making of the plant-insertion spaces, are disposed on opposite sides of the disc 22 and in spaced relation on opposite sides of the vertical central plane of the rotary unit. In other words, a space is opened between disc 22 and the adjacent circular member 23 on one side of the central plane, and simultaneously a space is opened between the disc 22 and the other member 23 on the opposite side of the central plane, as shown in Fig. 5. This arrangement allows operators to be seated at opposite ends of the rotary unit, one operator feeding plants into one opening, while the other operator is feeding plants into the other opening in alternate order. This facilitates a more rapid planting operation.

From the foregoing description it will be readily seen that there has been produced such a device as substantially fulfills the objects of the invention, as set forth herein.

While this specification sets forth in detail the present and preferred construction of the device, still in practice, such deviations from such detail may be resorted to as do not form a departure from the spirit of the invention, as defined by the appended claims.

Having thus described the invention, the following is claimed as new and useful and upon which Letters Patent are desired:

1. In a plant setting machine, a mobile frame, a rotary plant setting device mounted in said frame and comprising a hub rotatably mounted in said frame on a transverse horizontal axis, means to rotate said hub, a pair of relatively stiff but flexible discs, each of said discs having a central aperture receiving said hub, means on the hub to secure the discs thereto in axially spaced-apart relation for rotation with said hub, yieldable means mounted on the discs and rotatable therewith and effective to normally hold the discs in face to face relationship for a relatively short distance inwardly from the outer peripheries of the discs, such discs then arching outwardly from each other to the point of connection of the inner peripheries thereof with the hub, means projecting between the discs at a point adjacent the top of the discs effective to spread the contacting faces of the discs apart at that point for a predetermined arc of travel of the discs, and other means projecting between the discs at a point adjacent the bottom of the discs effective to spread the contacting portion of the faces of the discs apart at that point for a predetermined arc of travel.

2. A plant setting device comprising a main frame, a transverse horizontal shaft mounted in said main frame, a hub rotatable on the shaft, means to rotate the hub, a pair of discs of relatively stiff but flexible material, each of said discs having a central aperture receiving said hub, means on the hub to secure the discs to the hub in axially spaced-apart relation for rotation with said hub, yieldable means mounted on the outer faces of the discs and rotatable therewith and functioning to press the outer peripheral portions of the discs into closely adjacent face to face relationship, an upstanding rectangular frame supported from the main frame and overhanging the discs, a bar supported on the rectangular frame above the discs and depending therefrom to a position between the adjacent peripheral face portions of the discs, a pair of spaced rollers supported on the lower end of the bar and engaging the adjacent inner faces of the discs and effective to react against said yieldable means and continuously spread the adjacent peripheral faces of the discs apart for a predetermined arc of travel of the discs, whereby to provide a continuously open gore between the discs at one point for the reception of plants, and spreading means at another point to effectively move the adjacent peripheral faces of the discs apart to release plants therefrom.

3. A device as in claim 2 in which said last named means comprises a second bar fixed to the main frame in a plane intermediate the top and bottom of the peripheral line of travel of the discs, such second bar projecting between the discs at such point, one pair of spaced rollers adjacent the end of said second bar and another pair of spaced rollers on said second bar intermediate its ends, the rollers of both pairs engaging the inner faces of the discs and being effective to react against said yieldable means and spread the adjacent peripheral faces of the discs apart for a predetermined arc of travel.

HENRY P. CORDES.

REFERENCES CITED

The following references are of record in the file of this patent:

UNITED STATES PATENTS

| Number | Name | Date |
|---|---|---|
| 622,586 | Allison et al. | Apr. 4, 1899 |
| 1,654,861 | Cerati | Jan. 3, 1928 |
| 2,348,787 | Cordes | May 16, 1944 |
| 2,372,739 | Renault | Apr. 3, 1945 |

FOREIGN PATENTS

| Number | Country | Date |
|---|---|---|
| 358,463 | Great Britain | Published 1931 |
| 895,779 | France | Apr. 11, 1944 |